United States Patent
Samimi Sedeh et al.

(10) Patent No.: US 10,961,137 B2
(45) Date of Patent: Mar. 30, 2021

(54) WATER TREATMENT SYSTEM

(71) Applicants: Sina Samimi Sedeh, Sedeh Lenjan (IR); Ehsan Saebnoori, Tehran (IR)

(72) Inventors: Sina Samimi Sedeh, Sedeh Lenjan (IR); Ehsan Saebnoori, Tehran (IR)

(73) Assignee: Johan Dirk Bult, Boornbergum (NL)

( * ) Notice: Subject to any disclaimer, the term of this patent is extended or adjusted under 35 U.S.C. 154(b) by 300 days.

(21) Appl. No.: 15/809,919

(22) Filed: Nov. 10, 2017

(65) Prior Publication Data

US 2018/0065869 A1 Mar. 8, 2018

Related U.S. Application Data

(60) Provisional application No. 62/443,653, filed on Jan. 7, 2017.

(51) Int. Cl.
| | |
|---|---|
| *C02F 1/46* | (2006.01) |
| *C02F 1/467* | (2006.01) |
| *C02F 1/463* | (2006.01) |
| *C02F 1/461* | (2006.01) |

(52) U.S. Cl.
CPC ............ *C02F 1/4678* (2013.01); *C02F 1/463* (2013.01); *C02F 1/46109* (2013.01); *C02F 2001/46133* (2013.01); *C02F 2201/4618* (2013.01); *C02F 2303/04* (2013.01)

(58) Field of Classification Search
None
See application file for complete search history.

(56) References Cited

U.S. PATENT DOCUMENTS

| | | | | |
|---|---|---|---|---|
| 2,797,192 | A * | 6/1957 | Graff | ........................ C25B 1/265 423/643 |
| 3,862,022 | A * | 1/1975 | Hermann | ............ C02F 1/46109 204/272 |
| 6,974,562 | B2 | 12/2005 | Ciampi et al. | |
| 7,476,324 | B2 | 1/2009 | Ciampi et al. | |
| 2003/0094420 | A1 | 5/2003 | Licht | |
| 2003/0159942 | A1* | 8/2003 | Minevski | .................. C25B 1/00 205/477 |

(Continued)

FOREIGN PATENT DOCUMENTS

| | | |
|---|---|---|
| CN | 101570371 A | 11/2009 |
| CN | 103922458 A | 7/2014 |

(Continued)

OTHER PUBLICATIONS

Jia-Qian Jiang, Progress in the development and use of ferrate (VI) salt as an oxidant and coagulant for water and wastewater treatment, Water research 36.6 (2002): 1397-1408.

(Continued)

*Primary Examiner* — Salil Jain
(74) *Attorney, Agent, or Firm* — Bajwa IP Law Firm; Haris Zaheer Bajwa

(57) ABSTRACT

A method and an apparatus for water treatment are disclosed. The method includes steps of associating an iron anode and a cathode with a stream of water, forming an alkaline environment around the iron anode by injecting an alkaline electrolyte solution into the stream of water upstream of the anode. The method also includes generating a solution plasma in the stream of water by applying a potential difference between the iron anode and the cathode.

12 Claims, 4 Drawing Sheets

(56) References Cited

U.S. PATENT DOCUMENTS

| | | | |
|---|---|---|---|
| 2007/0217954 A1 | 9/2007 | Powell et al. | |
| 2015/0075992 A1* | 3/2015 | Cui | C02F 1/4608 204/674 |
| 2019/0284066 A1* | 9/2019 | Mullen | C02F 1/4674 |

FOREIGN PATENT DOCUMENTS

| | | |
|---|---|---|
| CN | 105417672 A | 3/2016 |
| CN | 105417787 A | 3/2016 |
| CN | 106082413 A | 11/2016 |

OTHER PUBLICATIONS

Amirreza Talaiekhozani, An overview on production and applications of ferrate (VI). Jundishapur Journal of Health Sciences 8.3 (2016).

Diwakar Tiwari, Ferrate (VI) in the treatment of wastewaters: a new generation green chemical. Waste Water-Treatment and Reutilization. InTech, 2011.

J.Q. Jiang, Research progress in the use of ferrate (VI) for the environmental remediation. Journal of Hazardous Materials 146.3 (2007): 617-623.

Jia-Qian Jiang, The online generation and application of ferrate (VI) for sewage treatment—A pilot scale trial. Separation and Purification Technology 68.2 (2009): 227-231.

Ljiljana Nikolić Bujanović, Pilot plant for treatment of raw drinking water with high content of arsenic using ferrate (VI), Acta Technica Corviniensis-Bulletin of Engineering 9.2 (2016): 19.

Jia-Qian Jiang, Drinking water treatment by in situ generated ferrate (VI). Desalination and Water Treatment 55.3 (2015): 731-739.

En-Long Yang, On-line electrochemical production of ferrate (VI) for odor control. Electrochimica Acta 63 (2012): 369-374.

Mohammad Alsheyab, On-line production of ferrate with an electrochemical method and its potential application for wastewater treatment—A review. Journal of Environmental Management 90.3 (2009): 1350-1356.

Ling Ding, Oxidation of CH 3 SH by in situ generation of ferrate (VI) in aqueous alkaline solution for odour treatment. Separation and purification technology 91 (2012): 117-124.

Rohan Gandhi, Treatment of combined sewer overflows using ferrate (VI). Water Environment Research 86.11 (2014): 2202-2211.

Luke Daly, Ferrate Versus Chlorine Disinfection: Disinfection By-Product Reduction and Other Benefits. Proceedings of the Water Environment Federation 2011.15 (2011): 2051-2057.

Thomas D. Waite, Chemistry-On-Site Production of Ferrate for Water and Wastewater Purification. American Laboratory 44.10 (2012): 26.

Bo Jiang, Review on electrical discharge plasma technology for wastewater remediation. Chemical Engineering Journal 236 (2014): 348-368.

* cited by examiner

WATER TREATMENT SYSTEM

CROSS-REFERENCE TO RELATED APPLICATION

This application claims the benefit of priority from U.S. Provisional Patent Application Ser. No. 62/443,653, filed on Jan. 7, 2017, and entitled "WATER AND WASTEWATER TREATMENT BY MULTI-FUNCTIONAL METHOD," which is incorporated herein by reference in its entirety.

TECHNICAL FIELD

The present disclosure generally relates to water and waste water treatment, and particularly to systems and methods for water and waste water treatment.

BACKGROUND

High oxidation states of iron, such as +4, +5, and +6 show strong oxidation and disinfection potential. Among these oxidation states, iron in the +6 oxidation state, which is referred to as Ferrate(VI) or simply Fe(VI), may function as a water and wastewater treatment agent. In contrast to chlorine, Fe(VI) can be used in treatment processes with fewer detrimental effects. Many contaminants in water and wastewater may be removed by Fe(VI). Sodium, potassium, and sodium-potassium ferrates are Fe(VI) salts that may be used in water treatment processes.

However, using Fe(VI) in water and wastewater treatment processes can be expensive and costly due to the Fe(VI) salt syntheses and stabilization steps. Moreover, Fe(VI) solutions are unstable, and the stability of these solutions is only in the order of a few hours at room temperature. As a result, without stabilization steps, the Fe(VI) solutions may not be stored even temporarily, greatly limiting their use as water and wastewater treatment agents.

One possible solution to address the stability limitations of the Fe(VI) solutions may involve on-line production of Fe(VI) solutions in water or wastewater treatment processes. For example, Fe(VI) may be produced using an electrochemical method or a wet chemical method in an on-line treatment system, where Fe(VI) is produced on-site and then added to the wastewater stream. However, such methods are associated with limitations such as low efficiency of Fe(VI) production and iron anode passivity over time. In addition, the complexity and cost of separating the Fe(VI) from the electrolyte limits can diminish the feasibility of implementing these methods. Thus, there is a need in the art for an efficient and less costly method that allows for the production of Fe(VI) with a higher production efficiency, while addressing the issue of the instability of the Fe(VI) solutions.

SUMMARY

In one general aspect, the present disclosure is directed to a method of water treatment. The method includes associating an iron anode and a cathode with a stream of water, and forming an alkaline environment around the iron anode by injecting an alkaline electrolyte solution into the stream of water at a location upstream of the anode. The method also includes generating a solution plasma in the stream of water by applying a potential difference between the iron anode and the cathode.

The above general aspect may include one or more of the following features. In one example, the alkaline electrolyte solution is selected from the group consisting of KOH, NaOH, and combinations thereof. In another example, the alkaline electrolyte solution includes a saturated alkaline electrolyte solution. In some implementations, the alkaline environment around the anode has an alkalinity of at least 10 M. Furthermore, in some cases, injecting the alkaline solution further includes injecting the alkaline solution into the stream of water at distance of at least 3 cm from the iron anode. In another example, the potential difference applied between the iron anode and the cathode ranges between 5 and 200 volts, while in other examples the potential difference applied between the iron anode and the cathode ranges between 25 and 50 volts.

In some cases, the generation of solution plasma in the stream of water leads to the formation of oxidizing species. In other implementations, the method can also include reducing ferrate(VI) to ferrate(III) ions, and/or generating a coagulant in the stream of water. In some implementations, the cathode includes a material selected from the group consisting of titanium alloys, stainless steel, nickel, nickel alloys, nickel-vanadium alloys, and combinations thereof. In another implementation, the method also includes continuously replacing the iron anode as the anode is consumed during generation of the solution plasma.

In another general aspect, the present disclosure is directed to an apparatus or system for water treatment. The system includes a channel including an outer wall that holds a stream of water. In addition, the system has an anode and a cathode, at least a portion of each of the anode and the cathode being in contact with the stream of water, the anode and the cathode being spaced apart by a first distance. The system further includes an injection pipe configured to inject an alkaline electrolyte solution into the stream of water at an injection site, the injection site being spaced apart from the anode by a second distance, as well as a power supply configured to apply an electric potential difference between the anode and the cathode.

The above general aspect may include one or more of the following features. The system can include a support member that supports the anode, the support member being secured to the outer wall of the channel. In one implementation, the first distance is approximately 3 cm. In some implementations, the second distance ranges between approximately 1 cm and 30 cm. In one example, about 1 cm of the anode is exposed to the stream of water. In another example, the cathode includes a substantially flat sheet made of stainless steel. In some other implementations, the alkaline electrolyte solution is selected from the group consisting of KOH, NaOH, and combinations thereof. In some cases, the anode includes a material that is selected from the group consisting of steel, carbon steel, cast iron, pure iron, and combinations thereof.

Other systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the following claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
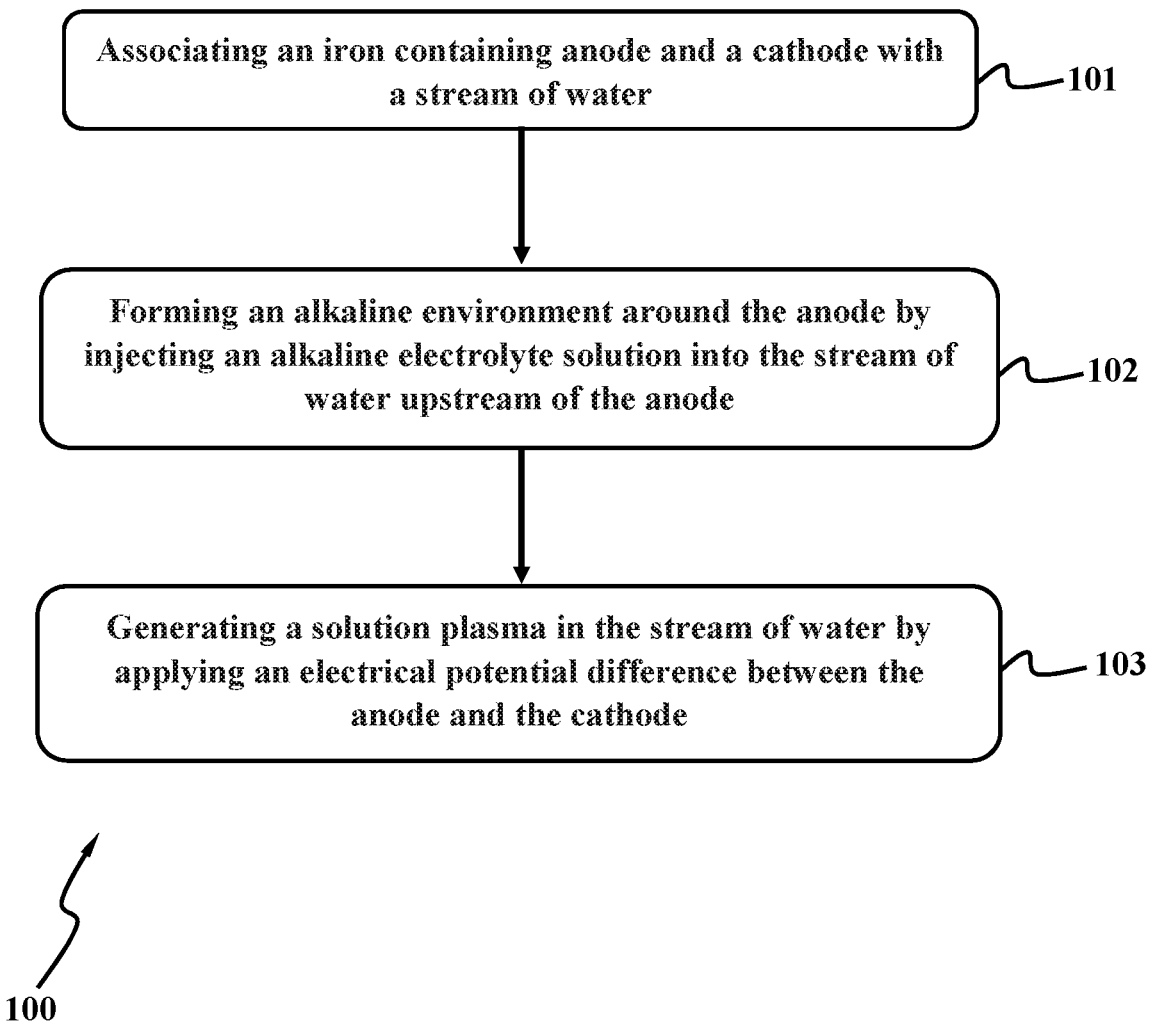
FIG. 1 illustrates a method for water treatment according to one or more implementations of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

As will be discussed herein, systems and methods directed to water and wastewater treatments are disclosed. The systems and methods may include in-situ production of ferrate(VI) ions in a stream of water and wastewater by a solution plasma method. The disclosed process provides significant benefits, including but not limited to more efficient production of Fe(VI) ions and a reduction in costs.

For ease of reference, any water being treated according the methods disclosed, contaminated water, or wastewater to be treated, will hereinafter be referred to as "water". In some implementations of the disclosed water treatment method, an iron containing anode and a cathode may be placed in the stream of water at a predetermined distance from one another. An electric potential difference can then be applied between the anode and the cathode. As a result, an electrical discharge is generated directly in the stream of water and a solution plasma may be generated. An alkaline electrolyte solution may be injected into the stream of water upstream of the anode in order to form an alkaline environment around the anode. The formation of the solution plasma in the alkaline environment can cause in-situ formation of ferrate (VI) ions in the stream of water.

Furthermore, it should be understood that ferrate(VI) ions that have a molecular formula of $FeO_4^{2-}$ may act as very strong oxidants. Under acidic conditions, the redox potential of ferrate(VI) ions is greater than ozone and is the strongest of all the oxidants/disinfectants practically used for water and wastewater treatment. Moreover, during the oxidation/ disinfection process, ferrate(VI) ions are reduced to Iron(III) or Fe(III) ions or ferric hydroxide, and this simultaneously generates a coagulant in the stream of water.

In addition to the in-situ production of ferrate(VI) ions, formation of solution plasma in the stream of wastewater can lead to various physical and chemical effects, such as primary formation of oxidizing species, including: radicals ($H^•$, $O^•$, $OH^•$) and molecules ($H_2O_2$, $O_3$, etc.), shockwave, ultraviolet light, and electrohydraulic cavitation. These physical and chemical effects have been shown to rapidly and efficiently degrade many organic compounds, including but not limited to, phenols, trichloroethylene, polychlorinated biphenyl, perchloroethylene and pentachlorophenol, acetophenone, organic dyes (such as methylene blue), aniline, anthraquinone, monochlorophenols, methyl tert-butyl ether (MTBE), benzene, toluene, ethyl benzene (BMX), and 2,4,6-trinitrotoluene, 4-chlorophenol, and 3,4-dichloroaniline.

Additional details regarding the disclosed method are provided with reference to FIG. 1. In FIG. 1, a flow chart depicting a method 100 for water treatment according to one or more aspects of the present disclosure is shown. In one implementation, the method 100 may include a first step 101 of associating an iron containing anode and a cathode with a stream of water; a second step 102 of forming an alkaline environment around or in the region surrounding the anode by injecting an alkaline electrolyte solution into the stream of water upstream of the anode; and a third step 103 of generating a solution plasma in the stream of water by applying an electric potential difference between the anode and the cathode.

Referring to FIG. 1, in different implementations, the first step 101 may involve placing or otherwise disposing an anode and a cathode in a stream of water at a predetermined distance from each other. According to some implementations, materials of the anode may include a sacrificial anode made of steel, carbon steel, cast iron, and/or pure iron. The anode may include a plate, a wire, a grid, and/or a sintered porous material. In addition, according to some implementations, materials of the cathode may include titanium alloys, stainless steel, nickel, nickel alloys, and/or nickel-vanadium alloys. The cathode may also include a plate, wire, grid, and/or a sintered porous material.

Figure 2:
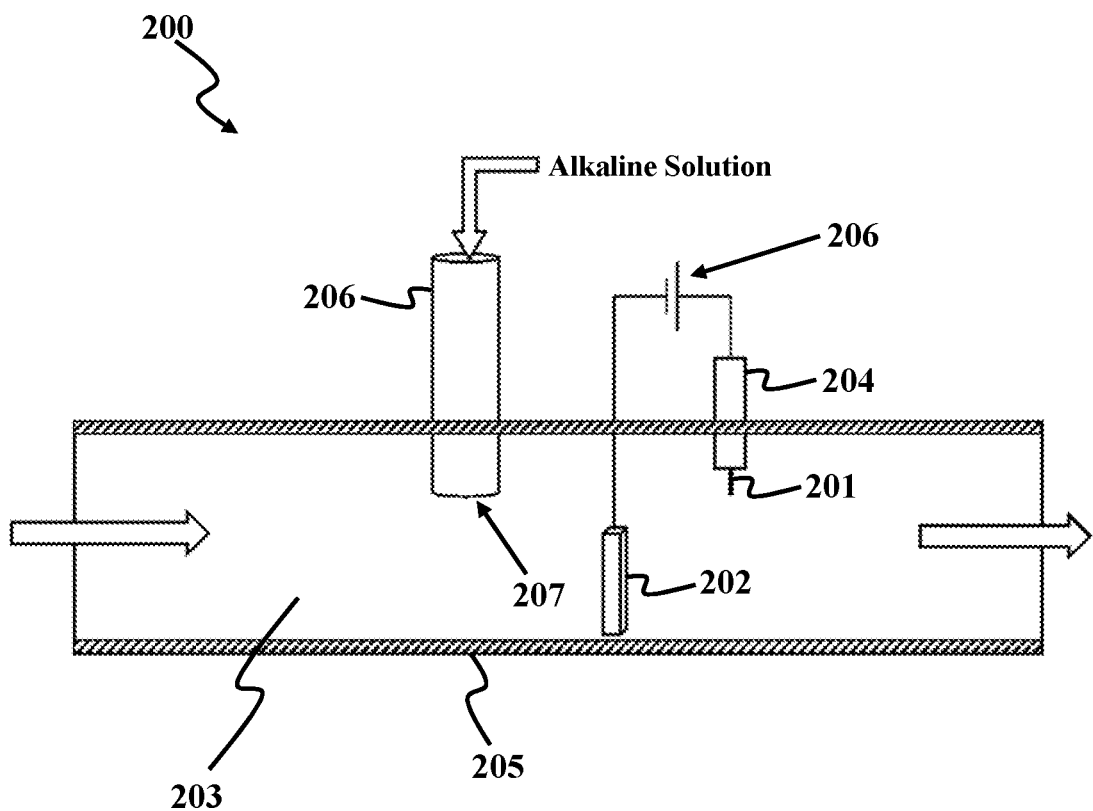
FIG. 2 illustrates a water treatment system according to one or more implementations of the present disclosure.

FIG. 2 illustrates an implementation of a water treatment system 200 that can be utilized with the method 100 described in FIG. 1. Referring now to both FIGS. 1 and 2, in one implementation of the first step 101 of the method 100, an anode 201 and a cathode 202 are positioned within or associated with a stream 203 of water. As an example, the anode 201 may be a wire made of plain carbon steel inserted into the stream 203 of water. In one implementation, the anode 201 may be held, secured, or otherwise supported by a support member 204 that is configured to facilitate insertion of the anode 201 inside the stream 203 of water in a water-tight configuration. Thus, in one implementation, the anode and support member are inserted in such a manner as to create a water-tight seal in the channel. The anode 201 wire may be continuously replaced through the support member 204 as the anode is consumed during the solution plasma production process. According to one implementation, about 1 cm of the anode 201 wire may be exposed to the stream 203 of water. In addition, in some implementations, the cathode 202 may include a flat sheet made of stainless steel. As one example, the anode 201 and the cathode 202 may be placed in the stream 203 of water at a distance of approximately 3 cm from one another, though in other implementations, the distance can vary between 0.5 cm and 50 cm or more. As shown in FIG. 2, in one implementation, the anode 201 may be secured or held in place near the center of a channel 205 configured to guide the stream 203 of water. In addition, in one implementation, the cathode 202 may be secured or held in place in the depth of the stream 203 of water.

Referring back to FIG. 1, in some implementations, during second step 102 of method 100, forming the alkaline environment around the anode may include injecting an alkaline electrolyte solution, such as potassium hydroxide (KOH), sodium hydroxide (NaOH), or a combination of KOH and NaOH into the stream of water, upstream of the anode. In the implementation of FIG. 2, the water treatment system 200 may include an alkaline solution injection pipe 206 inserted into the stream of water, upstream of the anode 201 at a predetermined distance from the anode 201. The alkaline solution may be injected into the stream 203 of water via the alkaline solution injection pipe 206 at a position along or in the stream 203 of water, which is referred to hereinafter as an injection site 207. According to some implementations, the predetermined distance between the injection site 207 and the anode 201 may be between about 1 cm and about 30 cm. It should be understood that in different implementations, the distance between the injection site 207 and the anode 201, as well as the flow rate at which the alkaline solution is injected into the stream 203 of water, may be manipulated to adjust the extent of the alkaline environment around the anode 201 and the alkalinity level around the anode 201. In one implementation, the alkalinity around the anode 201 may be at least 10 M.

Referring again to FIG. 1, with respect to the third step 103, according to one implementation, a solution plasma may be generated in the stream of water by applying an electric potential difference between the anode and the cathode. The electric potential difference must be higher than the on-site dielectric breakdown voltage between the anode and the cathode. In FIG. 2, a power supply 208 may be utilized to apply the electric potential difference between the anode 201 and the cathode 202. According to some implementations, the electric potential difference may be between 5 and 200 volts.

Figure 3:
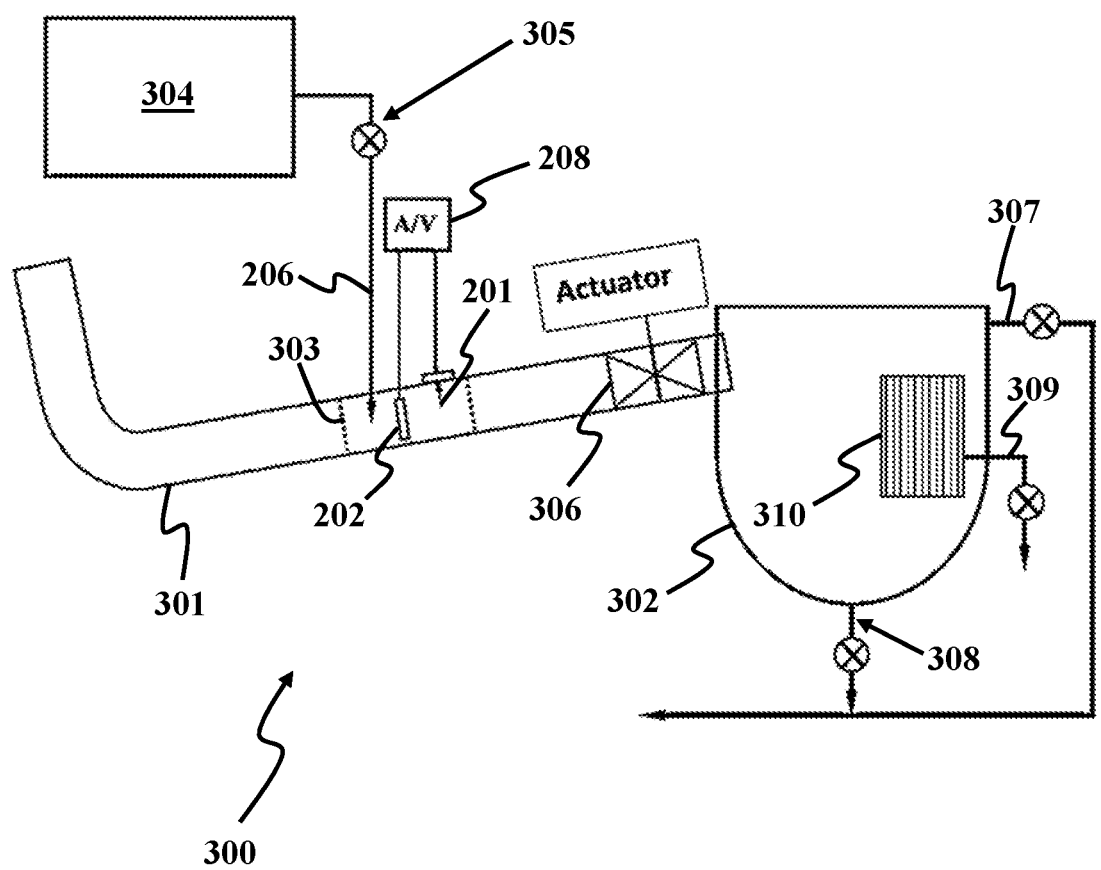
FIG. 3 illustrates a water treatment apparatus according to one or more implementations of the present disclosure.

FIG. 3 illustrates another implementation of a water treatment apparatus 300 according to one or more aspects of the present disclosure. The water treatment apparatus 300 may include the water treatment system 200 shown in FIG. 2, and may further be associated with a water transfer line 301. The water treatment apparatus 300 may also include a pond 302 for completing the flocculation process and separating the contaminants. In different implementations, the water transfer line 301 may include a pipe or a channel that transfers the water through the water treatment system 200 and then discharges the treated water into the pond 302 for carrying out the rest of flocculation process and contamination separation.

Referring to FIG. 3, in one implementation, the water treatment system 200 may be assembled or positioned directly inside the water transfer line 301. In other words, the anode 201 and the cathode 202 may be directly disposed or placed inside the water transfer line 301 and the alkaline solution may be directly injected into the water transfer line 301 via the alkaline solution injection pipe 206. According to some implementations, the water treatment system 200 may be assembled or located inside a housing 303 and the housing 303 may then be coaxially mounted in the water transfer line 301. In one implementation, the housing 303 may include a similar cross-section as the water transfer line 301 and the housing 303 may have openings at either end to allow the water to flow through the housing 303 and come into contact with the water treatment system 200.

With further reference to FIG. 3, the water treatment apparatus 300 may also include an alkaline solution storage tank 304. In different implementations, the alkaline solution may be injected from the storage tank 304 into the water treatment system 200. In different implementations, the flow rate at which the alkaline solution is injected into the stream of water may be adjusted via an assembly of valves 305. Moreover, in one implementation, a gate valve 306 may be utilized to open or close the flow of water into the pond 302.

In the apparatus shown in FIG. 3, the water to be treated may enter the water treatment apparatus 300 through the water transfer line 301. Furthermore, the water transfer line 301 can be configured to transfer the water into the water treatment system 200, where an alkaline solution is injected via the injection line 206 into the stream of water to create an alkaline environment around the anode 201. In some implementations, the power source 208 may be utilized to apply an electric potential difference between the anode 201 and the cathode 202 to produce a solution plasma in the stream of water.

The formation of solution plasma and associated sparking in the alkaline environment created around the anode 201 leads to the in-situ production of ferrate(VI) ions in the stream of water. With the in-situ formation of ferrate(VI) ions in the stream of water, oxidation/disinfection processes begin in the water. As a result, pollutants present in the stream of water may be decomposed and oxidized by the ferrate(VI) ions. During the oxidation/disinfection processes, ferrate(VI) ions will be reduced to Fe(III) ions or ferric hydroxide, which simultaneously generates a coagulant in the stream of water. The presence of coagulant can help the flocculation and/or sedimentation of the pollutants. In addition, the generation of the solution plasma in the stream of water in the water treatment system 200 may be associated with various physical and chemical effects, such as primary formation of oxidizing species including: radicals ($H^{\bullet}$, $O^{\bullet}$, $OH^{\bullet}$) and molecules ($H_2O_2$, $O_3$, etc.), shockwave, ultraviolet light, and electrohydraulic cavitation. These physical and chemical effects help to degrade the contaminants present in the water stream.

In different implementations, water can then be transferred through the transfer line 301 into the pond 302 in order to complete the flocculation and/or sedimentation process and to carry out the contamination separation process. The flocculation process is completed inside the pond 302, due to the reduction in the water pressure and coagulation effects of Fe(III) ions. In some implementations, a portion of the contaminants may float on the surface of water inside the pond 302, which may be collected and removed via an outlet 307. Another portion of the contaminants may settle at the bottom of the pond 302 and they may be discharged through outlets 308 provided under the pond 302. In addition, in one implementation, treated water may exit the pond 302 through an outlet 309. In some implementations, a filtering system 310 may be utilized for further filtration of the treated water before it is discharged from the water treatment apparatus 300 through the outlet 309.

EXAMPLE

In this example, a water treatment system and process according to an implementation of the present disclosure is described. For purposes of this disclosure, the water treatment system may include a system similar to the water treatment system 200 of FIG. 2.

Thus, referring to FIG. 2 for purposes of context and illustration, in this example, a wire made of plain carbon steel with a purity of 99.8 percent and a diameter of about 3 mm was used as the anode 201. Approximately 1 cm of the anode 201 was exposed to the stream 203 of water. A substantially flat plate with dimensions of about 3×3×0.2 cm made of stainless steel (approximately 70.3% iron, 19% chromium, 7.3% nickel, 1.81% manganese, and 1.19% of other elements) was used as the cathode 202. In this example, the anode 201 and the cathode 202 were placed at various distances from one another. Distilled water was used as the water to be treated and a pipe with a diameter of approximately 8 cm was utilized to guide the stream 203 of water. Three different alkaline solutions with different concentrations were prepared in order to be injected into the stream of water via the alkaline solution injection pipe 206. The alkaline solution injection line 206 included a pipe with a diameter of approximately 0.5 cm. In this example, incoming distilled water had a flow rate of approximately 200 mL/s.

In this example, three different alkaline solutions were tested: (1) a 21 M solution of NaOH; (2) a 19 M solution of KOH; and (3) a 50-50 vol % mixture of 21 M NaOH solution and 19 M KOH solution. Referring to FIG. 2, as noted above, different distances between the injection site 207 and the anode 201 were tested for the three alkaline solutions. In order to create an alkalinity of at least 10 M around the anode 201, the alkaline solutions had to be injected with predetermined flow rates and with predetermined distances from the anode 201. As shown in TABLE 1 below, different injection flow rates for different alkaline solutions for different injection distances from the anode 201 for the system of this example are presented. The flow rates reported in TABLE 1 represent the required flow rates of different alkaline solutions injected at different distances from the anode in order to create an alkaline environment with an alkalinity of at least 10 M around the anode. In this example saturated alkaline solutions were used.

TABLE 1

The amount of required saturated alkaline solution for different anode to injection site distances.

| R | The amount of saturated alkaline electrolyte required (mL/s) | | | Anode distance to injection site (cm) |
|---|---|---|---|---|
| | NaOH | KOH | KOH—NaOH | |
| 1 | 18.17 | 17.85 | 17.99 | 1 |
| 2 | 24.73 | 24.29 | 24.49 | 1.5 |
| 3 | 32.30 | 31.73 | 31.98 | 2 |
| 4 | 40.88 | 40.16 | 40.48 | 3 |
| 5 | 50.46 | 49/58 | 49.97 | 5 |
| 6 | 61.06 | 55/99 | 60.46 | 7 |
| 7 | 72.68 | 71/39 | 71.96 | 10 |
| 8 | 58.28 | 83.79 | 84.45 | 14 |
| 9 | 98.91 | 97.17 | 97.94 | 18 |
| 10 | 113.54 | 111.55 | 112.43 | 23 |
| 11 | 129.19 | 126.92 | 127.92 | 30 |

As shown in FIG. 2, according to some implementations of the present disclosure, the distance between the injection site 207 and the anode 201 may range between approximately 1 cm and approximately 30 cm. According to some implementations, the alkaline solution may be a NaOH solution, a KOH solution, or a mixture thereof with a concentration of at least 10 M. Furthermore, in this example, different electric potential differences were applied by the power supply 206 between the anode 201 and the cathode 202. The electric potential difference can range between 25 V and 50 V.

Figure 4:
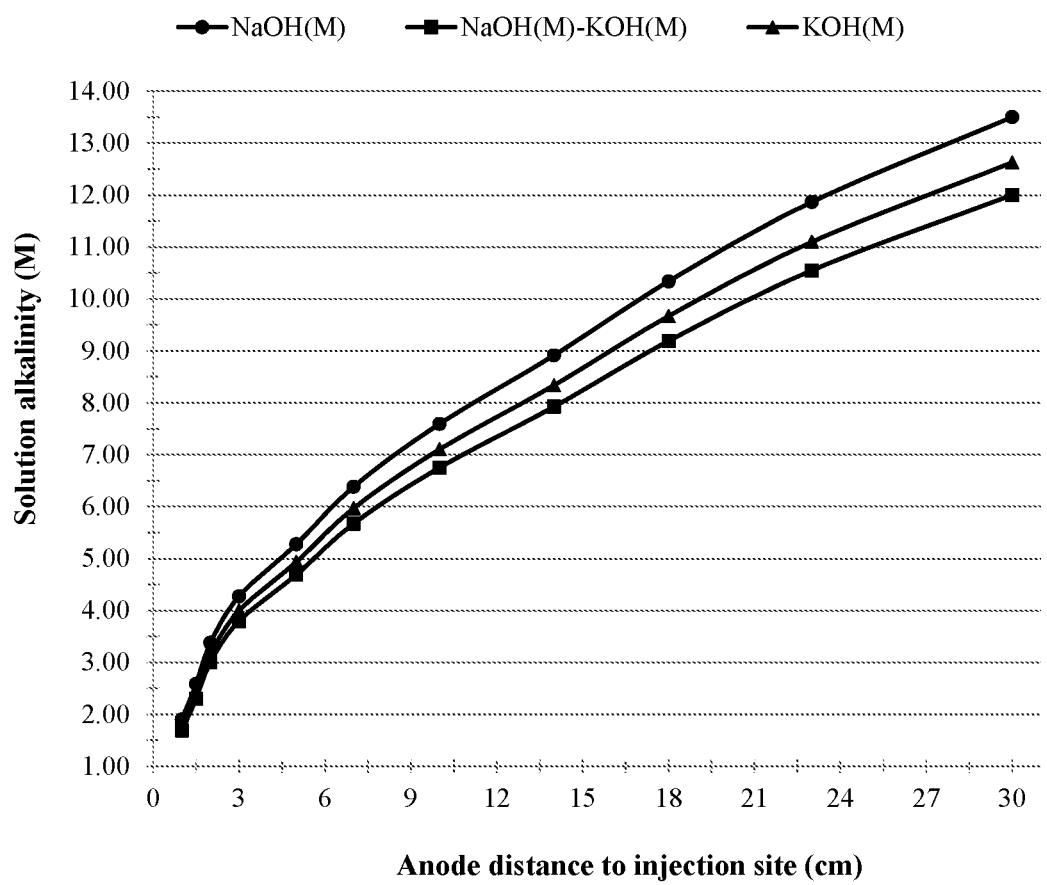
FIG. 4 illustrates an amount of ferrate(VI) ions produced in the water treatment system versus the potential difference applied between an anode and cathode, according to an implementation of the present disclosure.

For purposes of clarity, FIG. 4 illustrates the amount of ferrate(VI) ions produced in the water treatment system versus the potential difference applied between the anode and the cathode. The electrical conductivity of NaOH is less than those of the KOH solution and the NaOH—KOH mixtures. Therefore, complete plasma is formed at a lower electric potential difference in KOH compared to the NaOH and NaOH—KOH mixture. The highest production efficiency of sodium ferrate and sodium-potassium ferrate was achieved at the electric potential difference of about 60 V and at the electric potential difference of approximately 65 V for potassium ferrate. With increases in electric potential difference, plasma in liquid is formed, production of $H_2O_2$ and $OH^-$ increases, and these particles increase the production rate of ferrate(VI) nanoparticles.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A water treatment system comprising:
    a channel configured to allow a stream of water to flow through the channel from a first end of the channel to a second end of the channel;
    an anode, at least a portion of the anode configured to be in contact with the stream of water;
    a cathode, at least a portion of the cathode configured to be in contact with the stream of water, the anode and the cathode spaced apart by a first distance;
    an injection pipe configured to inject an alkaline electrolyte solution into the stream of water at an injection site upstream of the anode, the injection site spaced apart from the anode by a second distance; and
    a power supply configured to apply an electric potential difference between the anode and the cathode,
    wherein:
        the injection site is located a first end distance from the first end, the cathode is located a second end distance from the first end, and the anode is located a third end distance from the first end,
        the first end distance is less than the second end distance and the second end distance is less than a third end distance.

2. The system of claim 1, further including a support member that supports the anode, the support member secured to an outer wall of the channel.

3. The system of claim 1, wherein the first distance is 3 cm.

4. The system of claim 1, wherein the second distance ranges between 1 cm and 30 cm.

5. The system of claim 1, wherein 1 cm of the anode is configured to be exposed to the stream of water.

6. The system of claim 1, wherein the cathode comprises a flat sheet made of stainless steel.

7. The system of claim 1, wherein the alkaline electrolyte solution is selected from the group consisting of KOH, NaOH, and combinations thereof.

8. The system of claim 1, wherein the anode includes a material that is selected from the group consisting of steel, carbon steel, cast iron, pure iron, and combinations thereof.

9. The system of claim 1, wherein the alkaline electrolyte solution comprises a saturated alkaline electrolyte solution.

10. The system of claim 1, the electric potential difference between the anode and the cathode ranges between 5 and 200 volts.

11. The system of claim 1, the electric potential difference between the anode and the cathode ranges between 25 and 50 volts.

12. The system of claim 1, wherein the biggest surface of the cathode is parallel to respective cross-sections of respective openings at the first end and the second end.

* * * * *